US008191022B2

(12) United States Patent
Kim et al.

(10) Patent No.: US 8,191,022 B2
(45) Date of Patent: May 29, 2012

(54) STOCHASTIC STEADY STATE CIRCUIT ANALYSES

(75) Inventors: Jaeha Kim, Los Altos, CA (US); Jihong Ren, Sunnyvale, CA (US)

(73) Assignee: Rambus Inc., Los Altos, CA (US)

( * ) Notice: Subject to any disclaimer, the term of this patent is extended or adjusted under 35 U.S.C. 154(b) by 334 days.

(21) Appl. No.: 12/503,006

(22) Filed: Jul. 14, 2009

(65) Prior Publication Data

US 2010/0017763 A1 Jan. 21, 2010

Related U.S. Application Data

(60) Provisional application No. 61/080,919, filed on Jul. 15, 2008.

(51) Int. Cl.
*G06F 17/50* (2006.01)

(52) U.S. Cl. .......................... 716/106; 716/136

(58) Field of Classification Search .............. 716/106, 716/136; 703/2
See application file for complete search history.

(56) References Cited

U.S. PATENT DOCUMENTS

2010/0017173 A1* 1/2010 Fabin et al. ............... 703/2
* cited by examiner

*Primary Examiner* — Vuthe Siek
(74) *Attorney, Agent, or Firm* — Hickman Palermo Truong & Becker Bingham Wong LLP

(57) ABSTRACT

A method for simulating a system without a time invariant or periodically time-varying steady state is provided. The method limits the number of states included in a Markov chain model by discretizing the states based on Gaussian decomposition, utilizes a state exploration algorithm that discovers only recurrent states, and/or utilizes a state truncation algorithm that eliminates states with negligible stationary probabilities.

18 Claims, 12 Drawing Sheets

US 8,191,022 B2

STOCHASTIC STEADY STATE CIRCUIT ANALYSES

CROSS-REFERENCE TO RELATED APPLICATIONS; BENEFIT CLAIM

This application claims benefit of Provisional Application 61/080,919, filed Jul. 15, 2008, the entire contents of which is hereby incorporated by reference as if fully set forth herein, under 35 U.S.C. §119(e).

FIELD OF THE DISCLOSURE

The present disclosure relates generally to circuit modeling and analysis, and more particularly to techniques for performing stochastic steady-state and AC analyses of mixed-signal systems.

BACKGROUND

Linear system analysis has long been an indispensable tool for analog circuit designers. In order to benefit from such analysis, circuits are typically analyzed in their small-signal models from which various linear system parameters, such as poles, zeros, gain, and bandwidth, can be derived. Linear analyses, such as AC and periodic AC (PAC) analyses, effectively simulate the linearized response of the circuits. Due to the prevalence of linear analysis tools, analog circuit designers often strive to achieve certain linear system behaviors while minimizing nonlinearities such as offset and distortion. Linear analysis, however, is not easily applied to mixed-signal circuits because mixed-signal circuits do not have a steady-state response that is either time-invariant or periodically time-varying (PTV).

It is a steady trend in integrated circuit (IC) design to implement increasingly more analog circuits into mixed-signal systems with the digital circuits either replacing or assisting the analog circuits, due in part to CMOS transistors being poor gain elements but good, fast switches. For example, by leveraging the fast speed of digital logic, delta-sigma ($\Delta\Sigma$) data converters can achieve high resolutions without requiring the stringent accuracy required for analog circuits, namely, the uniform distribution of the effective threshold levels in data conversions between analog and digital domains. Also, many phase-locked loops (PLLs) now implement time-to-digital converters and digital-controlled oscillators so that the loop filters can be realized entirely in digital logic, thus reducing the large filter area and enabling more sophisticated control of the loop dynamics. Furthermore, many analog front-end circuits in wireless and wired communication systems are equipped with digital calibration loops that monitor and correct undesired properties of the circuits such as offset, skew, or duty-cycle error.

A common characteristic of these emerging mixed-signal systems is random behavior. For example, most digitally-controlled feedback loops including digital PLLs, delayed-locked loops (DLLs), and calibration loops show a periodic dithering when approaching the steady states rather than the exponential convergence shown by linear circuits, meaning the feedback systems do not settle into a constant state but rather alternate among multiple discrete states. Sometimes this randomness is even intentional. For example, $\Delta\Sigma$ modulators rely on randomness to shape the deterministic quantization errors to out-of-band random noise. Furthermore, injecting pseudo-random dithering into $\Delta\Sigma$ data converters has been found to improve linearity and suppress periodic idle tones. Dynamic element matching is another technique that randomizes the selection of the sub-elements so that any mismatch among them appears as random noise. Also in digital calibration loops, it has been reported that randomizing the calibration period can help reduce undesired harmonic tones that arise due to periodicity.

Despite the fact that many mixed-signal systems are stochastic, their design intents are still linear and simulating their adjoint linear system responses at the steady-states (e.g. the frequency-domain transfer function) is of high interest to the designers. An adjoint linear system refers to a hypothetical linear system which describes the responses of the original system at the designated steady state (also called operating point) for infinitesimal changes in an input signals. For example, the $\Delta\Sigma$ data converters are designed with specific signal transfer functions (STF) and noise transfer functions (NTF) to maximize the signal-to-noise ratio (SNR). Also, phase transfer functions are the most common way of describing the characteristics, such as bandwidth and jitter peaking, of a digital PLL. While AC and PAC analyses available in today's circuit simulators can efficiently simulate the adjoint linear responses for the circuits that have DC or periodic steady-states, these simulators cannot be applied to the above-mentioned mixed-signal systems that have stochastic steady-states.

Due to the unavailability of AC and PAC analyses, circuit designers often use time-domain analysis, also referred to as transient analysis, to simulate mixed-signal systems. The time required to perform transient analysis on complicated circuit designs, however, is often thousands or even hundreds of thousands times greater than the time required to perform AC or PAC analyses, and even with this increased testing time, the simulating achieved by transient analysis is less complete than that of AC or PAC analyses. It is therefore desirable to extend steady-state and AC analyses to mixed-signal systems with Stochastic steady states.

BRIEF DESCRIPTION OF THE DRAWINGS

Techniques and embodiments described in the disclosure are illustrated by way of example, and not by way of limitation, in the following figures.

DETAILED DESCRIPTION

Implementations disclosed include a method for efficiently enabling a system analysis tool to perform linear analyses on mixed-signal systems that have a Stochastic (i.e. statistical) steady state instead of a time-invariant steady state or a periodically time-varying steady state. When a mixed-signal system reaches its Stochastic steady state, the probabilities of transitioning from a current state to one of a discrete number of possible next states are time-invariant and can be determined by a Markov chain model. Techniques disclosed include limiting the number of states included in a Markov chain model by discretizing the states based on Gaussian decomposition, utilizing a state exploration algorithm that discovers only recurrent states, and/or utilizing a state truncation algorithm that eliminates states with negligible stationary probabilities.

Stochastic Steady-State (SSS) Analysis
Discretization of Continuous PDFs Via Gaussian Decomposition A finite, discrete-time Markov chain is characterized by its transition probability matrix $T=\{T_{ij}\}$'s whose elements describe the probabilistic progression of the states from time n to n+1:

$$T_{ij}=P(s[n+1]=s_i|s[n]=s_j) \text{ for } i,j=1,2,\ldots,N, \quad (1)$$

where s[n] is the system state vector at time n and the Markov chain is assumed to have N discrete states $s_1$, $s_2, \ldots, s_N$. The Markov chain property states that the state probability distribution at time n+1, p[n+1], depends solely on p[n] via the expression:

$$p[n+1]=T \cdot p[n], \quad (2)$$

where p[n] is an N×1 vector $\{p_i[n]\}$'s and $p_i[n]$ is $P(s[n]=s_i)$. If the matrix T is constant regardless of n (i.e. time-homogeneous), then Perron-Frobenius theorem states that the stationary distribution vector $\pi$ of the Markov chain can be found by solving:

$$\lim_{n \to \infty} p[n] = \pi = T \cdot \pi. \quad (3)$$

With continuous state variables in mixed-signal systems, the number of states in the Markov chain model can grow quickly with the number of variables. Therefore, techniques disclosed include constructing, from a circuit model, a Markov chain model with a feasible number of states for performing time-efficient analysis on a system such as a personal computer.

A Markov chain model describes how the state probability distribution evolves over time, making it desirable to represent the probability distribution over continuous state space. In theory, the distribution is best represented with continuous probability density functions (PDFs), but techniques disclosed herein include discretizing the distribution, both in time and value, to enable time-efficient numerical computation. As most mixed-signal systems are sampled-data systems, the time axis is often already discretized, thus requiring only an efficient way of expressing the probability distribution and projecting it across a unit time step.

Figure 1A:
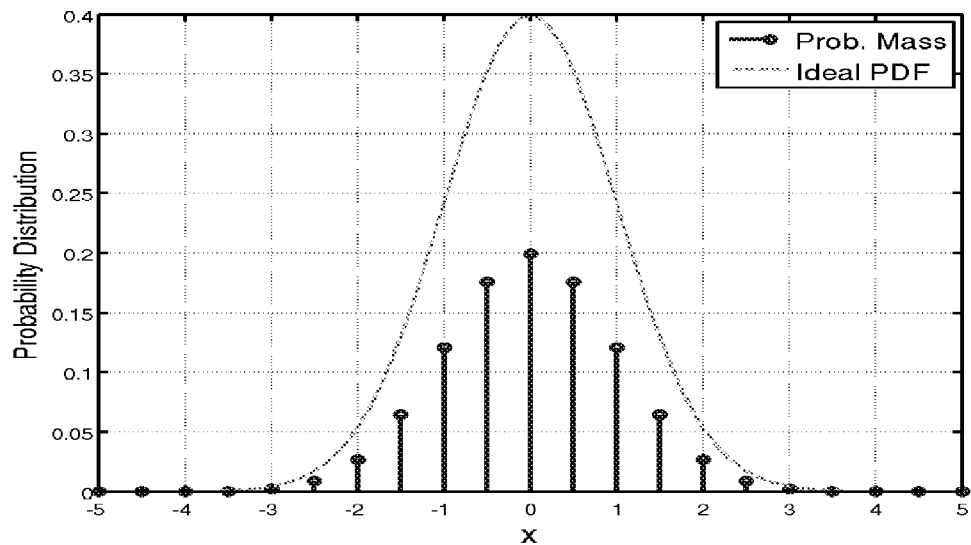
FIGS. 1a-b show representations of probability distributions over continuous state space as a set of probability masses and a set of Gaussian basis functions.

A PDF can be approximated by a probability mass function defined for a set of discrete points covering the continuous state space, as illustrated in FIG. 1(a). If a system is governed by a state-space equation shown below:

$$s[n+1]=f(s[n]), \quad (4)$$

then the probabilities at time n+1, p[n+1], can be computed based on p[n] via the following expression:

$$P(s[n+1]=s_i) = \sum_j \delta_{ij} \cdot P(s[n]=s_j), \quad (5)$$

where $\delta_{ij}$ is 1 if the quantized $f(s_j)$ is equal to $s_i$ and 0 otherwise.

Figure 2A:
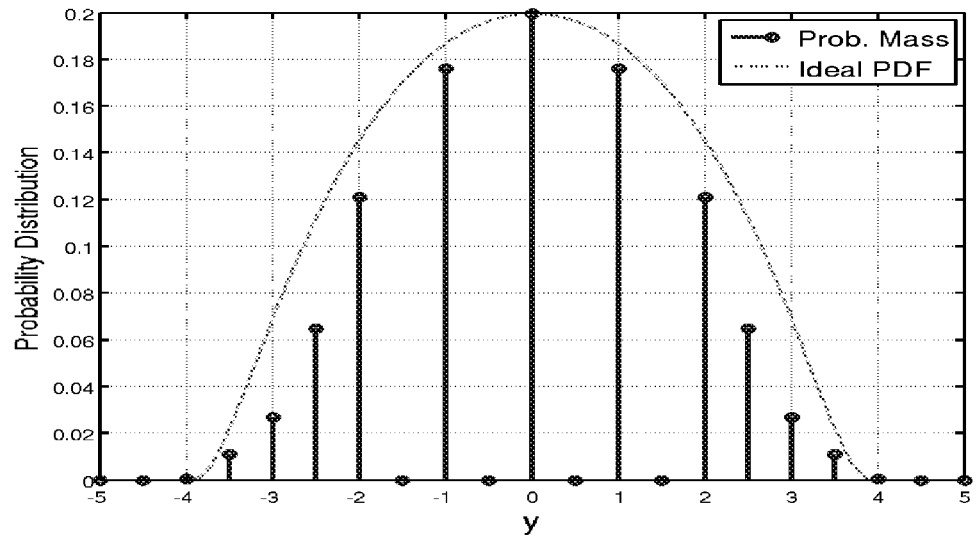
FIGS. 2a-b show a probability distribution after the state projection y=4 tan h(x/2) for a set of probability masses and a set of Gaussian basis functions.

One problem with this approach is that the probability masses from time n may project non-uniformly onto the state grids at time n+1, resulting in a probability distribution that differs from the true results. FIG. 2(a) illustrates this problem. When the state-projection function $f(.)$ has high sensitivity to s[n], the adjacent points at time n may map to distant points at time n+1, leaving the points in-between with zero probabilities. A brute-force solution is to use the finer grids. Alternative solutions may include using adaptive grids or interpolation schemes.

Figure 1B:
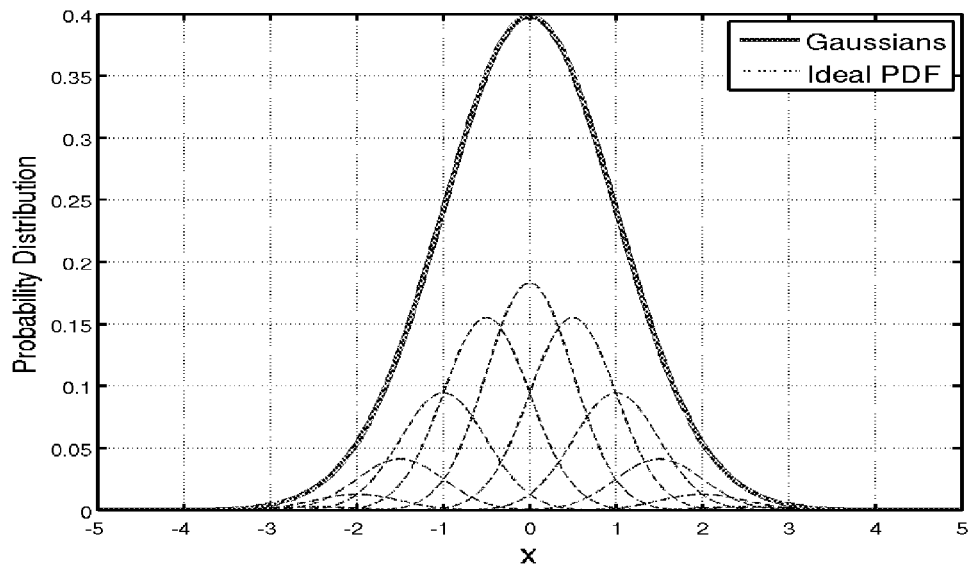

To mitigate this problem, techniques disclosed herein include representing a PDF with a set of Gaussian basis functions, as shown in FIG. 1b, rather than with point-mass probabilities. The state probability distribution $f_{PDF}(s[n])$ can be approximated as a weighted mixture of Gaussian PDFs centered at each discrete state point with fixed variance:

$$f_{PDF}(s[n]) \cong \sum_i w_i[n] \cdot g(s[n]-s_i), \quad (6)$$

where $w_i$'s are non-negative real numbers with their sum equal to 1 and g(.) is the normal distribution function with mean of 0 and variance of $\sigma_G^2$. With $\sigma_G$ equal to half the grid spacing, any function which is smooth on scales below $\sigma_G$ can be decomposed into a set of Gaussians basis functions. For purposes of explanation, a one-dimensional case will be described, but the techniques disclosed herein can be extended to multi-dimensional cases as well.

Gaussian decomposition can simply and accurately compute the projected probability distribution at the next time step, $f_{PDF}(s[n+1])$, even when the grids are coarse. Assuming the same state-projection function $f(.)$ defined as before, $f_{PDF}(s[n+1])$ can be computed via:

$$f_{PDF}(s[n+1]) \cong \sum_i w_i[n] \cdot g\left(\frac{s[n+1]-f(s_i)}{df/ds_i}\right). \quad (7)$$

Each of the sub-Gaussian component $g(s[n]-s_i)$ in equation (6) takes a new mean $f(s_i)$ and a new variance $\sigma_G^2 \cdot (df/ds_i)^2$ where $df/ds_i$ is the derivative of $f$ with respect to the state $s_i$. If $g((s[n+1]-f(s_i))/(df/s_i))$ can be decomposed to the original set of Gaussians $g(s[n+1]-s_j)$ with a new set of weighting coefficients $w'_{ij}$, for $j=1,\ldots N$, the expression for $f_{PDF}(s[n+1])$ becomes:

$$f_{PDF}(s[n+1]) \cong \sum_i \sum_j w'_{ij} \cdot g(s[n+1]-s_j) \quad (8)$$

$$= \sum_j w_j[n+1] \cdot g(s[n+1]-s_j).$$

Figure 2B:
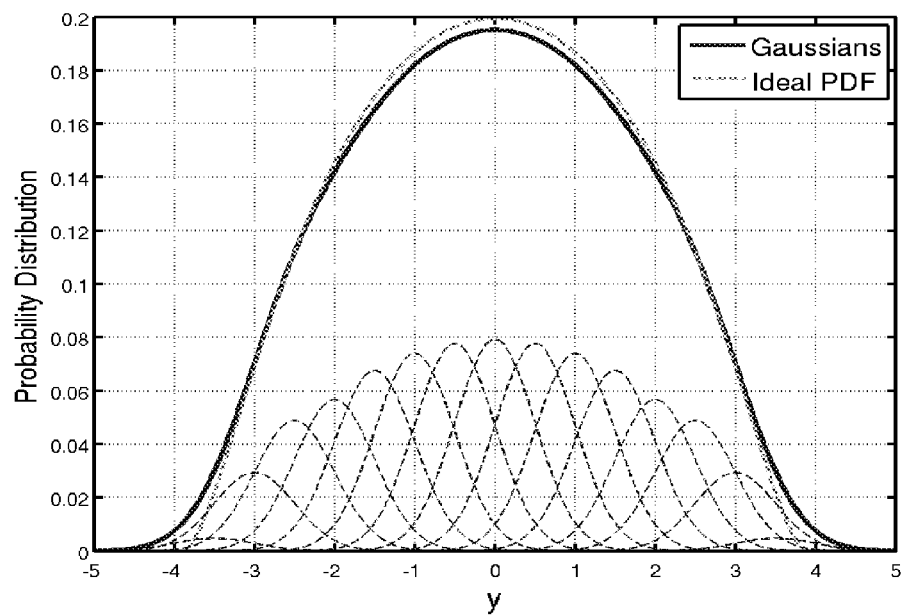

FIG. 2(b) plots the projected PDF based on the Gaussian decomposition method with the same set of grid points as in the previous case of FIG. 2(a). Scaling the variance of each Gaussian component with the derivative of the projection function can perform the optimal interpolation between the discrete points.

Decomposition of the projected Gaussian PDF into the original set of Gaussian bases can be carried out by a simplified expectation-maximization (EM) algorithm which performs the maximum likelihood fitting of the weighting coefficients. The initial weights computed based on the adjusted Gaussian PDF with variance equal to $\sigma^2-\sigma_G^2$ give estimates that limit the number of iterations, for example to less than 20 with 0.1% tolerance.

Based on the Gaussian mixture representation, the probability distribution vector $p[n]=\{p_i[n]\}$'s corresponds to the weights $\{w_i[n]\}$'s and the transition probability $T_{ji}$ can be computed as:

$$T_{ji}=w_j[n+1] \text{ of } f_{PDF}(s[n+1]) \text{ in (8) given } s[n] \sim N(s_j, \sigma_G^2). \quad (9)$$

This new transition probability matrix T remains stochastic (i.e. the elements are non-negative and the sum of each row is equal to 1) and all the existing methods to compute the stationary distribution $\pi$ of a Markov chain can still apply.

Once $\pi$ is computed, various statistics of the system such as mean E[X], variance Var[X], auto-correlation $R_{XX}[n]$, and power spectral density PSD(f) can be derived as follows:

$$E[X]=v_X^T \cdot \pi, \quad (10)$$

$$\text{Var}[X]=(v_X-E[X])^T \cdot \text{diag}(\pi) \cdot (v_X-E[X])+\sigma_G^2, \quad (11)$$

$$R_{XX}[n]=v_X^T \cdot T^n \cdot \text{diag}(\pi) \cdot v_X+\sigma_G^2, \quad (12)$$

$$PSD(f)=\text{Discrete Fourier Transform of } R_{XX}[n] \quad (13)$$

where $v_X$ is an N×1 vector of $\{v_{x,i}\text{'s}\}$ and $v_{x,i}$ is the value of the signal X at state $s_i$. For discrete states whose probabilities are represented with point masses, the equations (11) and (12) still remain valid except that $\sigma_G$ is set to zero.

State Exploration Algorithm

Once a set of discrete points to cover the continuous state space is determined, the next step is to determine which state points should be included in the Markov chain model. As discussed earlier, including all the points is frequently infeasible as the number increases exponentially with the dimension of the state space. To limit the number of state points to a manageable number, techniques disclosed herein include eliminating transient states and limiting the set of state points to recurrent states, i.e., the states with positive stationary probabilities. A state is called recurrent if once the system visits that state, there is a non-zero probability that it will visit the state again in the future.

Figure 3:
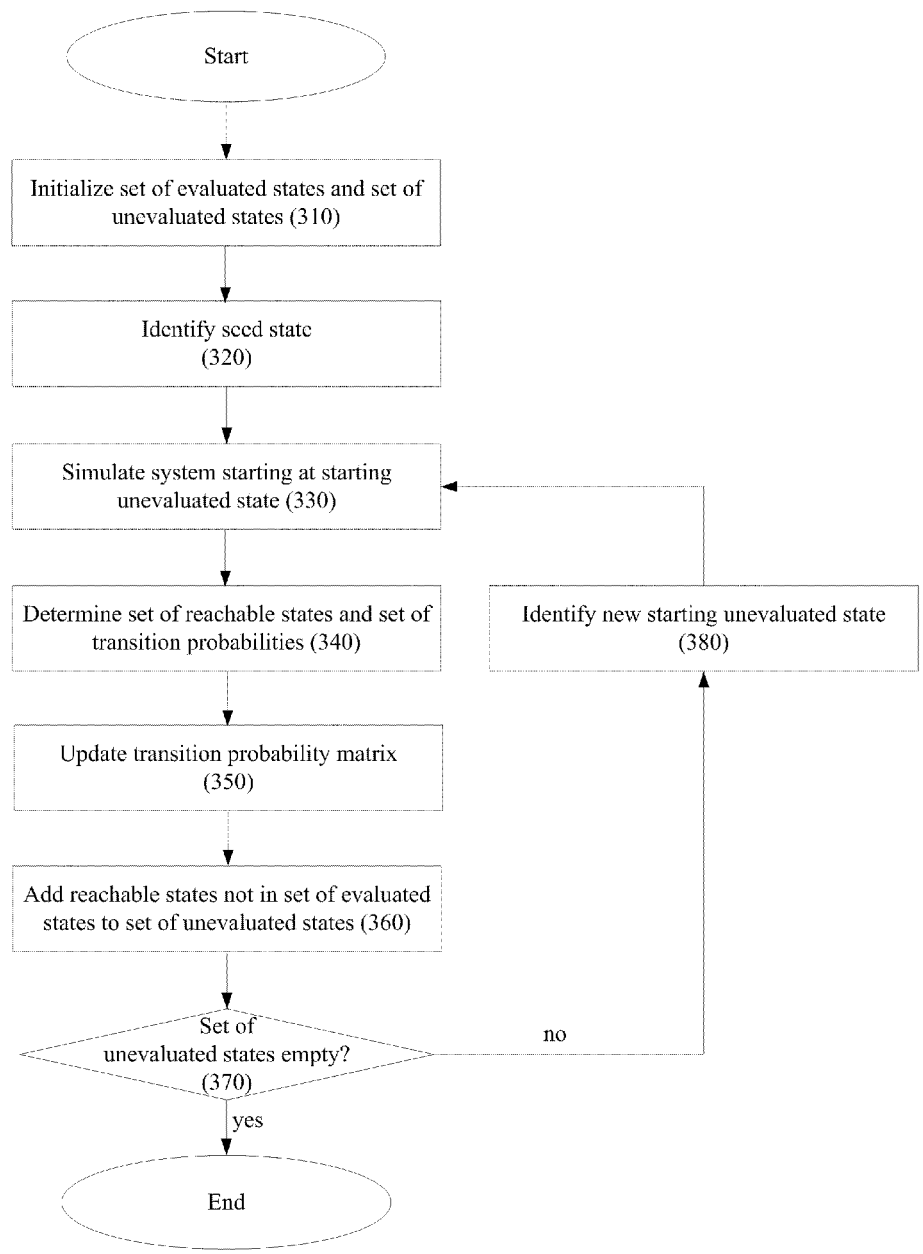
FIG. 3 is a flow diagram showing a state exploration algorithm.

FIG. 3 is a flow diagram showing an algorithm for building a transition probability matrix T consisting only of the states that are reachable from a seed state. Two sets of states can be initialized, with the first set corresponding to evaluated states and the second set corresponding to unevaluated states (block 310). A recurrent state suitable for use as a seed state can be can be identified as a first unevaluated state (block 320). The seed state can be identified by running an initial transient simulation, by inspection, or in some instances may be known to a designer. Starting from a starting unevaluated state, the stochastic system response from the starting unevaluated state can be simulated (block 330). In a first iteration of the algorithm, the starting unevaluated state will be the seed state. From the simulation, a set of reachable states from the starting unevaluated state and a set of transition probabilities from the starting unevaluated state to the reachable states can be determined (block 340). All the states reachable by the recurrent seed state are also recurrent states. Based on the determined set of reachable states and transition probabilities, a transition probability matrix can be updated (block 350). Reachable states not in the set of evaluated states can be added to the set of unevaluated states (block 360). If no reachable states are added to the set of unevaluated states and the set of unevaluated states is empty, then the algorithm ends (block 370, "yes" path). If there are reachable states in the set of unevaluated states (block 370, "no" path), then an unevaluated state is chosen as a new starting unevaluated state (block 380), and the algorithm returns to block 330.

The algorithm incrementally updates the list of reachable states as well as the transition probability matrix T whenever it encounters a new reachable state. The algorithm terminates when no more reachable states are found and the transition probabilities for all the known states are computed.

Using the state exploration algorithm of FIG. 3, the number of states needed in the transition probability matrix T no longer scales with the total state space dimension, but rather with the intrinsic dimension of the stationary distribution. For example, if a system has a deterministic periodic steady state, the Markov chain model would contain the states that span a one-dimensional space (i.e. a loop) even if the system state has more than 100 dimensions. Additionally, provided that the seed state is a positively recurrent state, it can be guaranteed that the constructed transition probability matrix T is positive and irreducible, which has a unique eigenvector for the eigenvalue of 1 along with many desired properties for the sound computation of $\pi$.

Low-Probability State Truncation Algorithm

Although all the reachable states found by the state exploration algorithm of FIG. 3 are recurrent and have positive stationary probabilities, a sizable portion of them might have probabilities that are very close to zero. These states can pose ill-conditioned problems when computing $\pi$ (e.g. the sub-dominant eigenvalues can be very close to 1). In a typical digital PLL, for example, it is common for more than 40% of the recurrent states to occupy an aggregate probability of less than 0.1%. Due to this relatively tiny contribution, techniques disclosed herein can include truncating these states to further reduce the number of states in the Markov chain.

The state exploration algorithm of FIG. 3 can compute the transition probabilities for the reachable states in no particular order. In contrast, in an alternative embodiment, techniques include evaluating the states with larger stationary probabilities first. Upon choosing a next state to evaluate the transition probabilities for, the probability leakage from the set of evaluated states ($S_e$) to the set of unevaluated states can be computed. If the total probability leakage is below a certain threshold (e.g., 0.001%), then the algorithm can terminate. Otherwise, the unevaluated state through which the probability leaks the most, or close to the most, can selected as the next state.

This so-called probability leakage can be computed by solving an intermediate Markov chain with all the transition probabilities originating from the unevaluated states and arriving at the evaluated states set to $1/N_e$, where $N_e$ is the number of the currently evaluated states. In other words, the probability flux that leaves the evaluated set immediately returns to the evaluated set uniformly. It can be shown that the stationary probability $\pi_i$ associated with an unevaluated state $s_i$ corresponds to the probability leakage from the evaluated states via the state $s_i$:

$$\pi_i = \sum_{s_j \in S_e} T_{ij} \cdot \pi_j \tag{14}$$

An unevaluated state with a large probability leakage is likely to have significant contribution by itself or lead to other unvisited states that have large contributions. The computational cost of repeatedly solving the intermediate Markov chain can be kept low by iteratively refining the solution found in the previous step. Using the power method, the solution $\pi$ is refined by the following iteration:

$$\pi \leftarrow T_{1:N_e} \cdot \pi_{1:N_e}, \tag{15}$$

$$\pi_j \leftarrow \pi_j + \frac{1}{N_e} \sum_{s_i \in S_u} \pi_i \text{ for } s_j \in S_e. \tag{16}$$

The iteration is a sparse matrix multiplication and converges to a solution within 0.1% in less than 10 iterations. These intermediate solutions need not be accurate as they are only to evaluate the termination criteria and to select the next state for evaluation.

Figure 4:
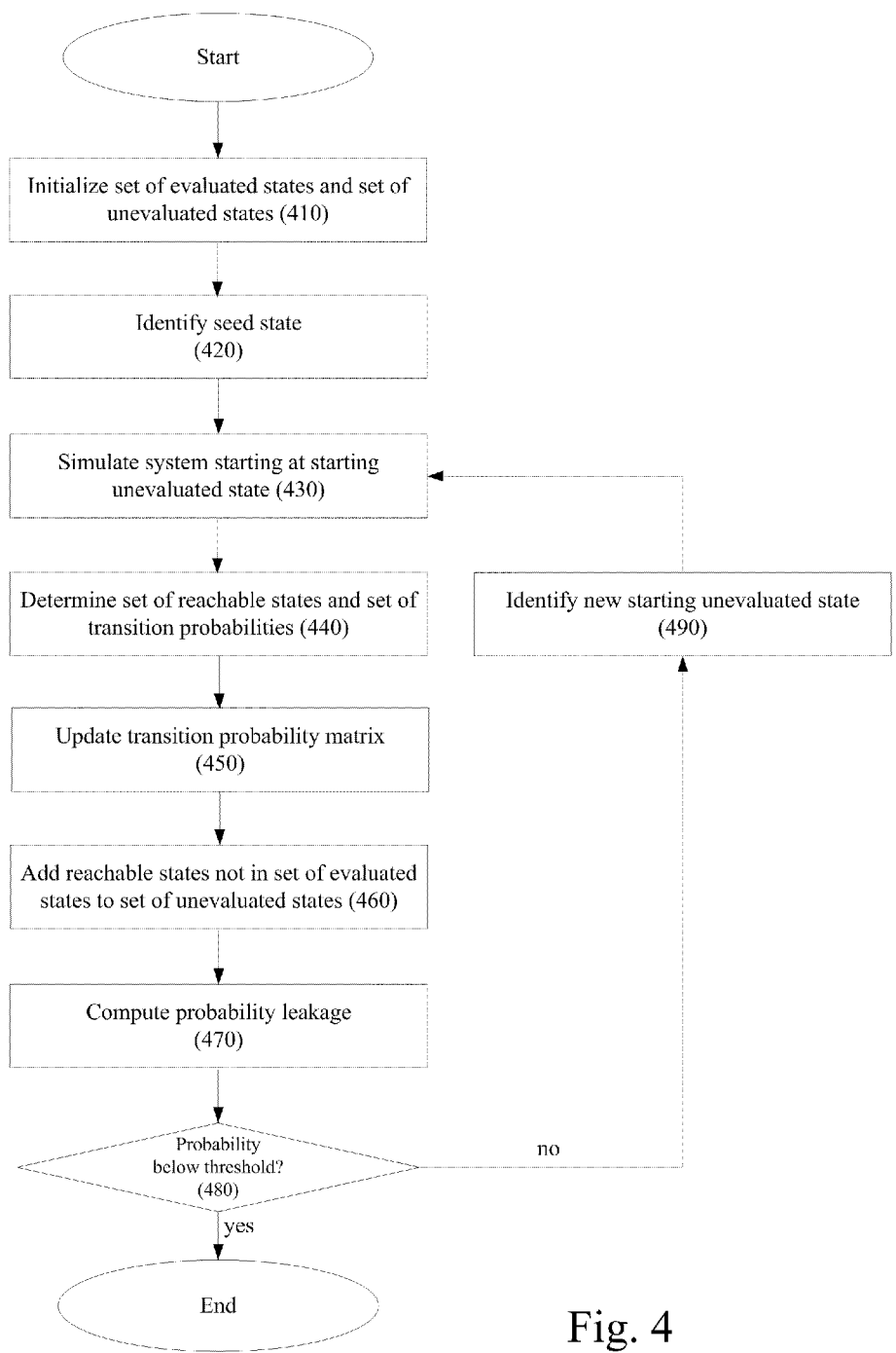
FIG. 4 is flow diagram showing a state exploration algorithm with low-probability state truncation.

FIG. 4 is a flow diagram showing an alternative state exploration algorithm that terminates early if it determines that the remaining states have negligible probabilities. The alternative state exploration algorithm builds a transition probability matrix T consisting only of the states that are reachable from a seed state. Two sets of states can be initialized, with the first set corresponding to evaluated states and the second set corresponding to unevaluated states (block 410). A recurrent state suitable for use as a seed state can be can be identified as a first unevaluated state (block 420). The seed state can be identified by running an initial transient simulation, by inspection, or in some instances may be known to a designer. Starting from a starting unevaluated state, the stochastic system response from the starting unevaluated state can be simulated (block 430). In a first iteration of the algorithm, the starting unevaluated state will be the seed state. From the simulation, a set of reachable states from the starting unevaluated state and a set of transition probabilities from the starting unevaluated state to the reachable states can be determined (block 440). All the states reachable by the recurrent seed state are also recurrent states. Based on the determined set of reachable states and transition probabilities, a transition probability matrix can be updated (block 450). Reachable states not in the set of evaluated states can be added to the set of unevaluated states (block 460).

A probability leakage identifying the probability of transitioning from any state in the set of evaluated states to any state in the set of unevaluated states can be calculated as discussed above (block 470). If the probability leakage is below a threshold value, then the algorithm can end (block 480, "yes" path). If the probability is greater than a threshold value (block 480, "no" path), then a specific unevaluated state with a high probability leakage is chosen as the next starting unevaluated state (block 490), and the algorithm returns to block 430.

Stochastic AC Analysis

Stochastic AC (SAC) analysis measures the steady-state, sinusoidal perturbations in the stationary distribution $\pi$ in response to a small-signal, sinusoidal input u. As the AC and PAC analyses do for time-invariant and PTV circuits, respectively, the SAC analysis provides the frequency-domain transfer function of a stochastic mixed-signal system linearized at its steady states.

To simulate the SAC transfer function, a perturbation matrix $\Delta T$ is first considered, whose elements $\{\Delta T_{ij}\}$'s describe the changes in the transition probabilities due to a change in u:

$$\Delta T_{ij} = \partial T_{ij} / \partial u \tag{17}$$

The adjoint linear system can be derived by substituting T with $T + \Delta T \cdot \delta u$ and $p[n]$ with $\pi + \delta \pi[n]$ in the Markov chain model (2):

$$\pi + \delta\pi[n+1] = (T + \Delta T \cdot \delta u) \cdot (\pi + \delta\pi[n]) \approx T \cdot \pi + T \cdot \delta\pi[n] + \Delta T \cdot \pi \delta u \tag{18}$$

Since $\pi = T \cdot \pi$, a linear, first-order ODE that governs the time progression of the perturbation in the probability vector $\delta\pi$ can be obtained as follows:

$$\delta\pi[n+1] = T \cdot \delta\pi[n] + \Delta T \cdot \pi \delta u \tag{19}$$

The steady-state sinusoidal response can be computed by solving this adjoint linear ODE via phasor analysis. The phasor analysis starts by substituting the input and output variables in the ODE with their respective phasor expressions:

$$\delta u[n] = U \cdot \exp(jn\omega T_s) \tag{20}$$

$$\delta\pi[n] = P \cdot \exp(jn\omega T_s) \tag{21}$$

where U is a complex scalar, P is a N×1 complex vector, and $T_s$ is the sampling period of the system. Substituting these expressions in (19) yields:

$$P \cdot \exp(j(n+1)\omega T_s) = T \cdot P \cdot \exp(jn\omega T_s) + \Delta T \cdot \pi \cdot U \cdot \exp(jn\omega T_s) \tag{22}$$

$$(\exp(j\omega T_s) \cdot I - T) \cdot P = \Delta T \cdot \pi \cdot U \tag{23}$$

Therefore, the SAC response P can be obtained by solving (23).

From the SAC response phasor P, the frequency-domain transfer function for various statistical parameters of the system can be computed using the equations similar to (10)-(13). For example, the transfer function from the input u to the mean value of the signal X, E[X], can be computed by:

$$H_X(j\omega) = E[X(j\omega)] / U(j\omega) = v_X^T \cdot P(\omega) \tag{24}$$

Stochastic Mixed-Signal System Examples

Digitally-Controlled Phase-Locked Loop

Figure 5A:
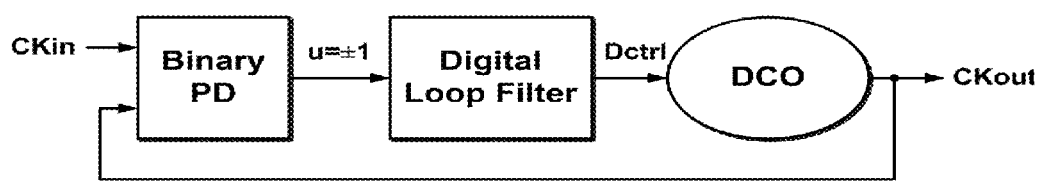
FIGS. 5a-b show diagrams of a digitally-controlled phase-locked loop and its discrete-time system model.
Figure 5B:
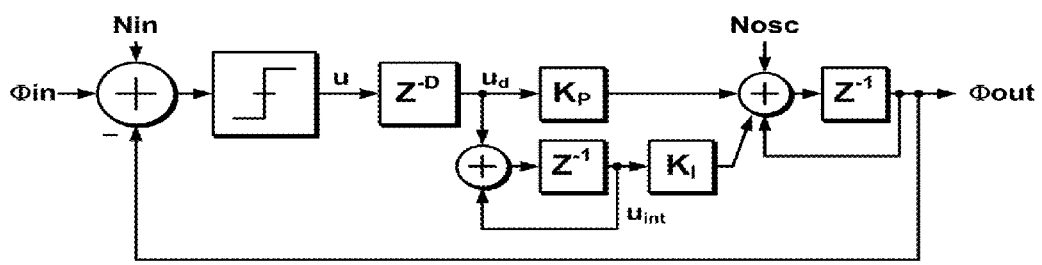
Figure 6A:
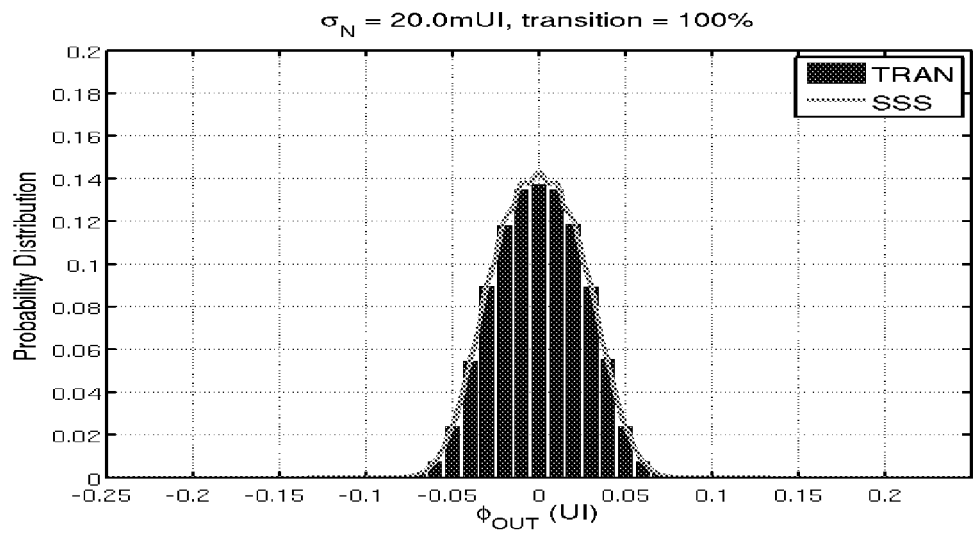
FIGS. 6a-d show simulated jitter histograms.
Figure 6B:
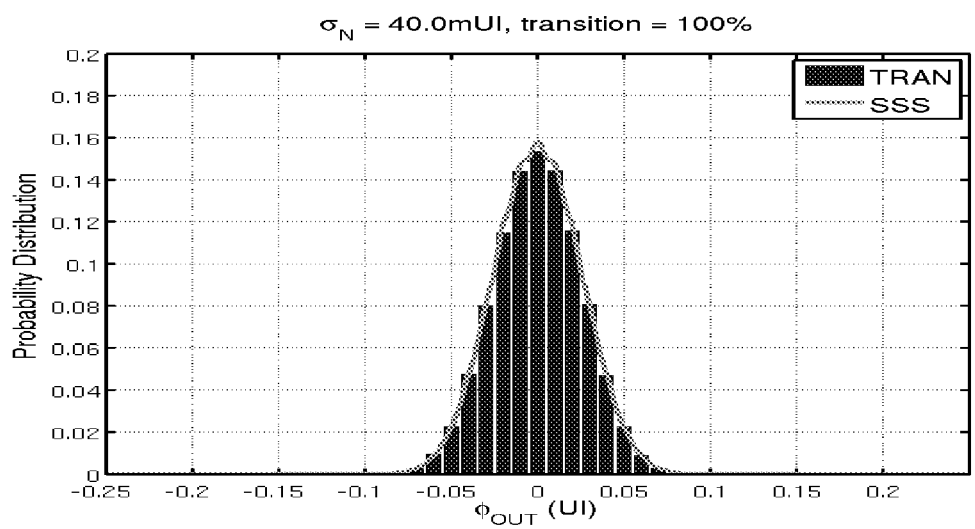
Figure 6C:
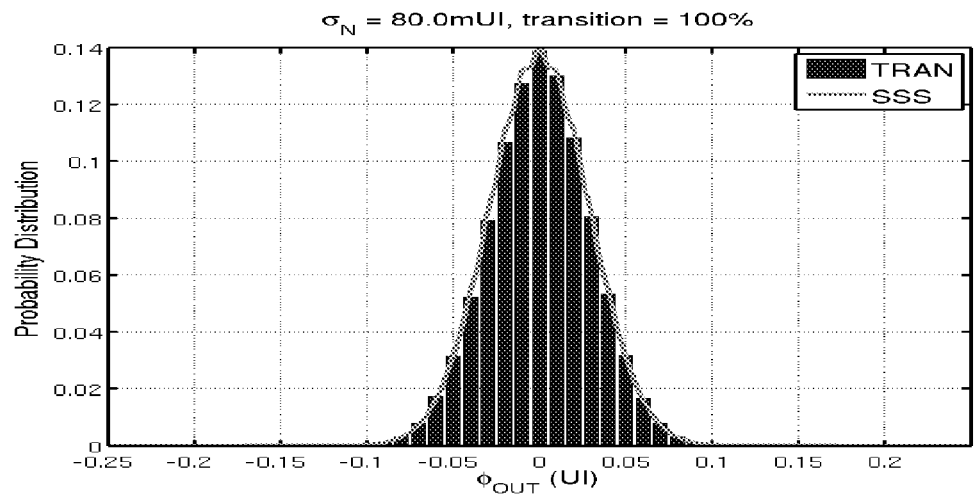
Figure 6D:
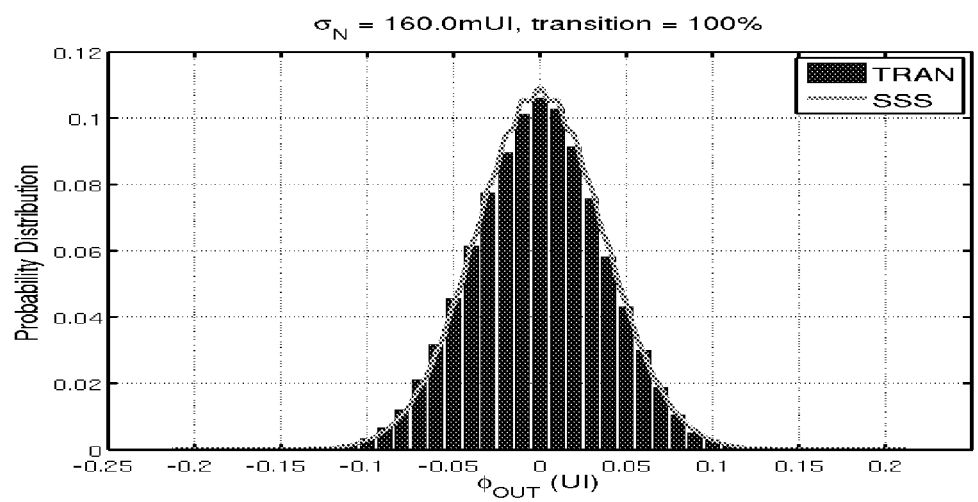

FIG. 5*a* depicts an example of a digitally-controlled PLL with a binary phase detector (PD), and FIG. 5*b* depicts its discrete-time system model. The binary phase detector measures the polarity of the difference between the input and output clock phases, $\Phi_{in}$ and $\Phi_{out}$, and a digital loop filter updates the frequency of a digitally-controlled oscillator (DCO) accordingly. The loop filter may incur a delay of D cycles. The output phase variable $\Phi_{out}$ is continuous while other variables within the loop filter (u, $u_d$, and $u_{int}$) are discrete. Two noise sources in this system are also modeled: the phase noise of the input clock ($N_{in}$) and that of the oscillator ($N_{osc}$).

Figure 7:
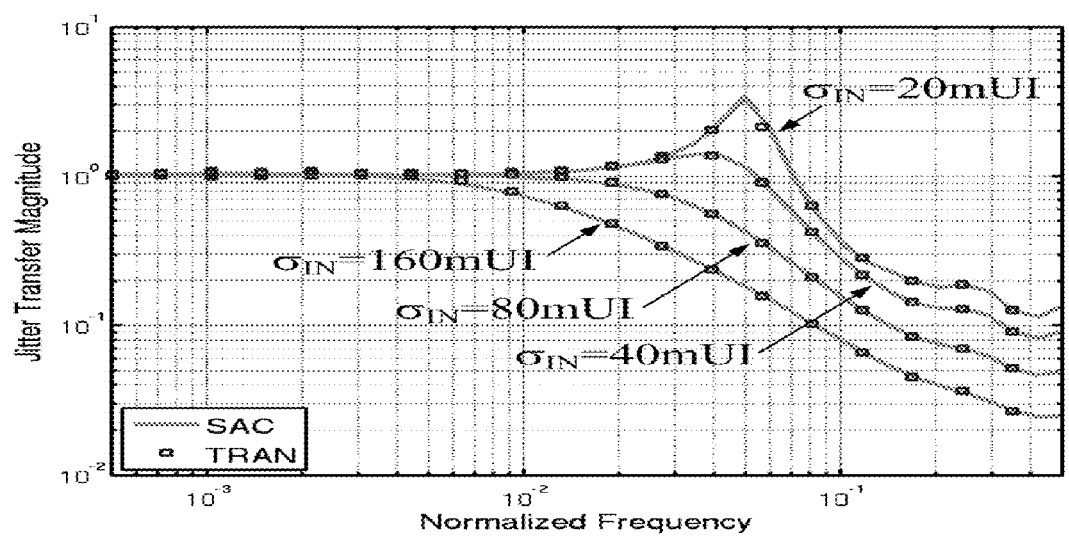
FIG. 7 shows simulated jitter transfer functions.

First, the stochastic steady-state (SSS) analysis is performed in various noise settings. The results are summarized in Table I and the jitter histograms are shown in FIGS. 6*a-d*. The values of $\Phi_{out}$ is discretized in 101 steps between −0.5~0.5 UI and $u_{int}$ has a range of −150~150. With the loop filter delay (D) of 4, the total number of states is 121,606. However, the results summarized in Table I show that state exploration/truncation algorithms embodying techniques disclosed herein reduced the number of states to well below 10,000 with the probability leakage threshold of 0.001%. The results from a 100,000-cycle Monte-Carlo transient simulation are also shown in Table I. The jitter histograms of FIG. 7 show good match between the two cases. Both simulations were run in Matlab on a 64-bit Linux machine with 2.53-GHz Intel Core 2 Duo processor and 4-GB memory. While the simulation times for the transient simulations stay constant regardless of the noise conditions, the SSS simulations take longer with the increasing number of states.

Next, the stochastic AC (SAC) analysis is performed to measure the jitter transfer function of the PLL. The results are plotted in FIG. 7 and summarized in Table II. To measure the AC transfer function with transient analysis, a series of simulations with different sample noise waveforms was run with and without a small sinusoidal perturbation on the input phase. That is, an ensemble of the resulting perturbations in the system responses was collected. Then the steady-state sinusoidal response in the mean perturbation response was estimated and the procedure was repeated for each excitation frequency. In the simulation, an ensemble of 100 perturbation responses with each response spanning 10,000 cycles was simulated. Apparently, it was very time-consuming for the transient analysis to measure the AC transfer functions and the proposed SAC analysis achieved large speed-up factors ranging from 57 to 170.

Delta-Sigma Analog-to-Digital Converter

Figure 8A:
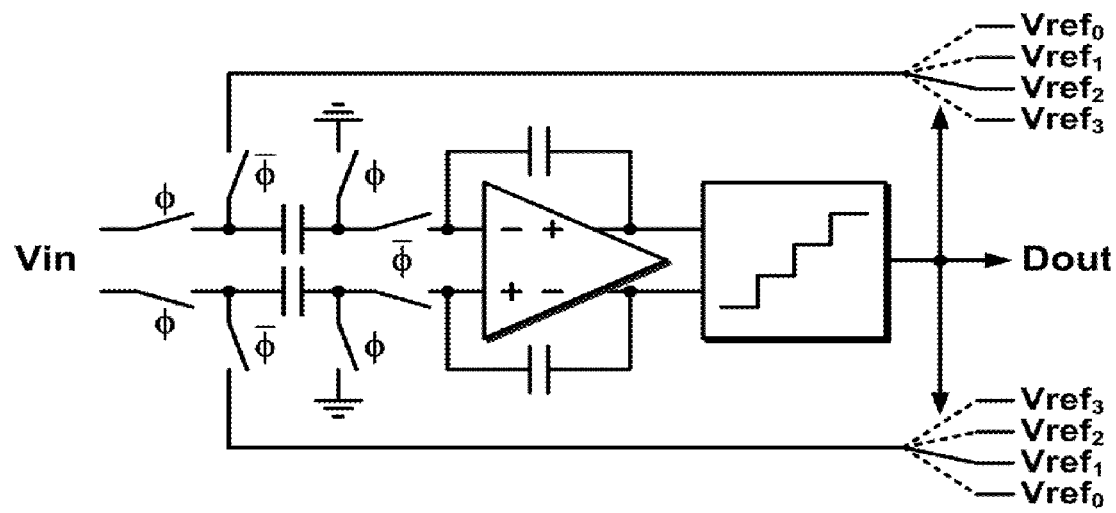
FIGS. 8a-b show a first-order $\Delta\Sigma$ ADC and its discrete-time system model.
Figure 8B:
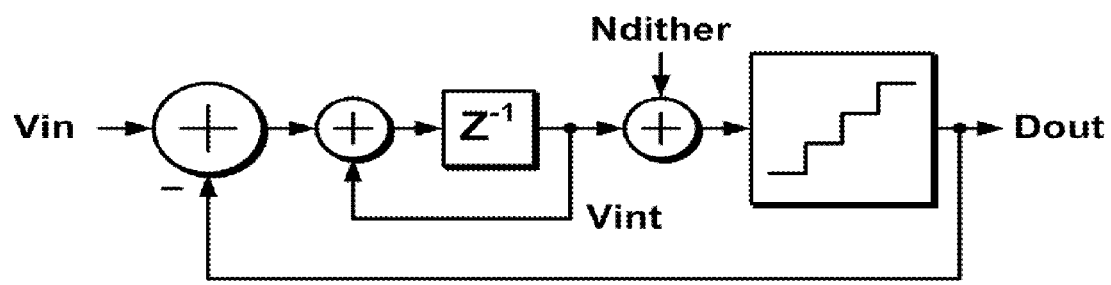

FIG. 8a shows the schematic of a first-order low-pass $\Delta\Sigma$ ADC with 4-level quantizer. FIG. 8b shows the discrete-time system model of system of FIG. 8a. The $\Delta\Sigma$ modulator accumulates all the quantization errors in the past and adds its value to the input signal when performing the next data conversion. The quantizer output $D_{out}$ is in 4 discrete levels while the integrator output $V_{int}$ is continuous. The dither noise ($N_{dither}$) being injected into the quantizer input can be modeled.

Figure 9:
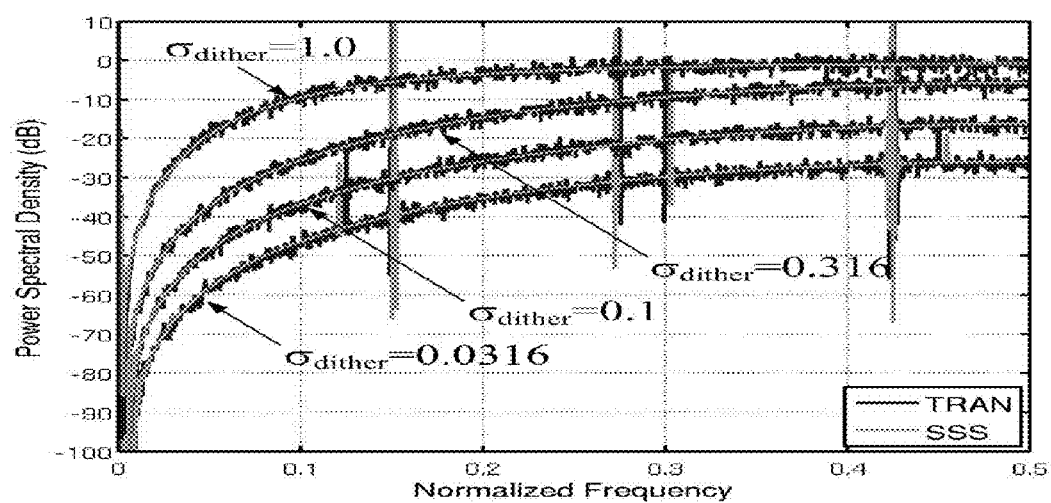
FIG. 9 shows a simulated quantization noise spectrum.
Figure 10:
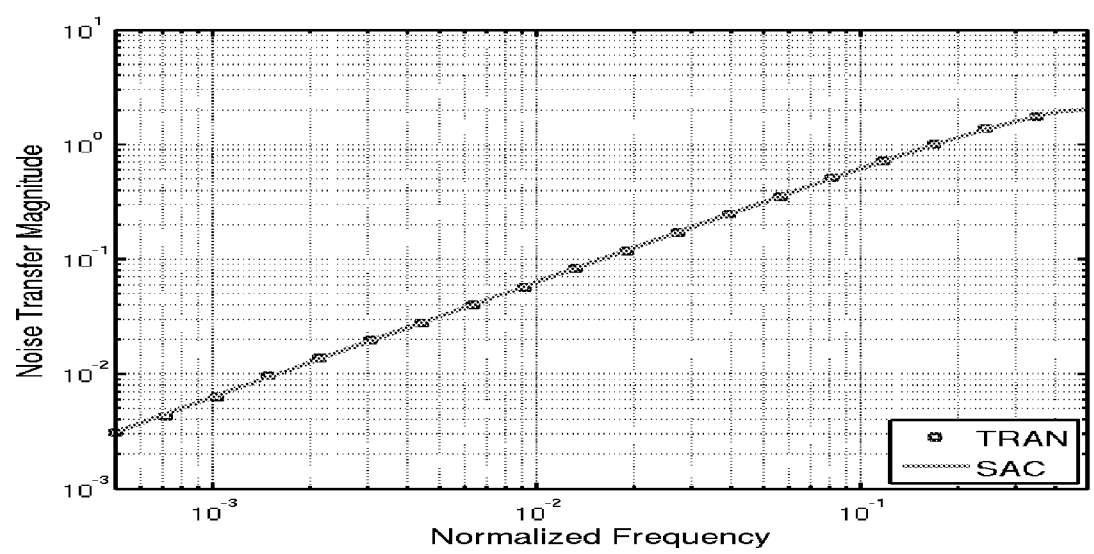
FIG. 10 shows a simulated noise transfer function.

The SSS and SAC analyses are performed for various levels of dither noise and the simulated quantization noise PSD and noise transfer function (NTF) are plotted in FIGS. 9 and 10, respectively. Tables III and IV summarize the results along with the transient simulation results. The Markov chain model for this first-order $\Delta\Sigma$ ADC was rather small with only 804 states in total and both SSS and SAC analyses showed very short simulation times. Nonetheless, the largest speed-up of 22263 was achieved by the state exploration/truncation algorithms which reduced to the number of states down to 61.

TABLE I

SSS simulation results for the digital PLL.

| $\sigma_{IN}$ (mUI) | # of Evaluated States/ # of Non-Zeros | Simulation Time SSS/TRAN (sec.) | $\sigma_{OUT}$ SSS/TRAN (mUI) |
|---|---|---|---|
| 20 | 3496/20916 | 31.73/0.84 | 25.44/25.29 |
| 40 | 4301/25806 | 40.79/0.80 | 25.10/24.95 |
| 80 | 5555/33330 | 56.11/0.82 | 28.92/29.02 |
| 160 | 7915/47490 | 89.03/0.85 | 37.03/37.73 |

TABLE II

SAC simulation results for the digital PLL.

| $\sigma_{IN}$ (mUI) | Simulation Time SAC/TRAN (sec.) | Speed-Up Factor |
|---|---|---|
| 20 | 1.85/315.51 | 170.5× |
| 40 | 2.55/314.61 | 123.4× |
| 80 | 3.39/316.69 | 93.42× |
| 160 | 5.53/315.12 | 56.98× |

TABLE III

SSS simulation results for $\Delta\Sigma$ ADC.

| $\sigma_{dither}$ | # of Evaluated States/ # of Non-Zeros | Simulation Time SSS/TRAN (sec.) | $\sigma_{OUT}$ SSS/TRAN |
|---|---|---|---|
| 0.0316 | 61/109 | 0.14/0.74 | 0.1111/0.1111 |
| 0.1 | 158/504 | 0.17/0.74 | 0.1129/0.1131 |
| 0.316 | 436/1741 | 0.37/0.73 | 0.2628/0.2627 |
| 1.0 | 795/3180 | 0.57/0.74 | 0.6377/0.6380 |

TABLE IV

SAC simulation results for $\Delta\Sigma$ ADC.

| $\sigma_{dither}$ | Simulation Time SAC/TRAN (sec.) | Speed-Up Factor |
|---|---|---|
| 0.0316 | 0.013/289.42 | 22263.1× |
| 0.1 | 0.034/291.25 | 8566.2× |
| 0.316 | 0.14/290.99 | 2078.5× |
| 1.0 | 0.35/289.89 | 828.3× |

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
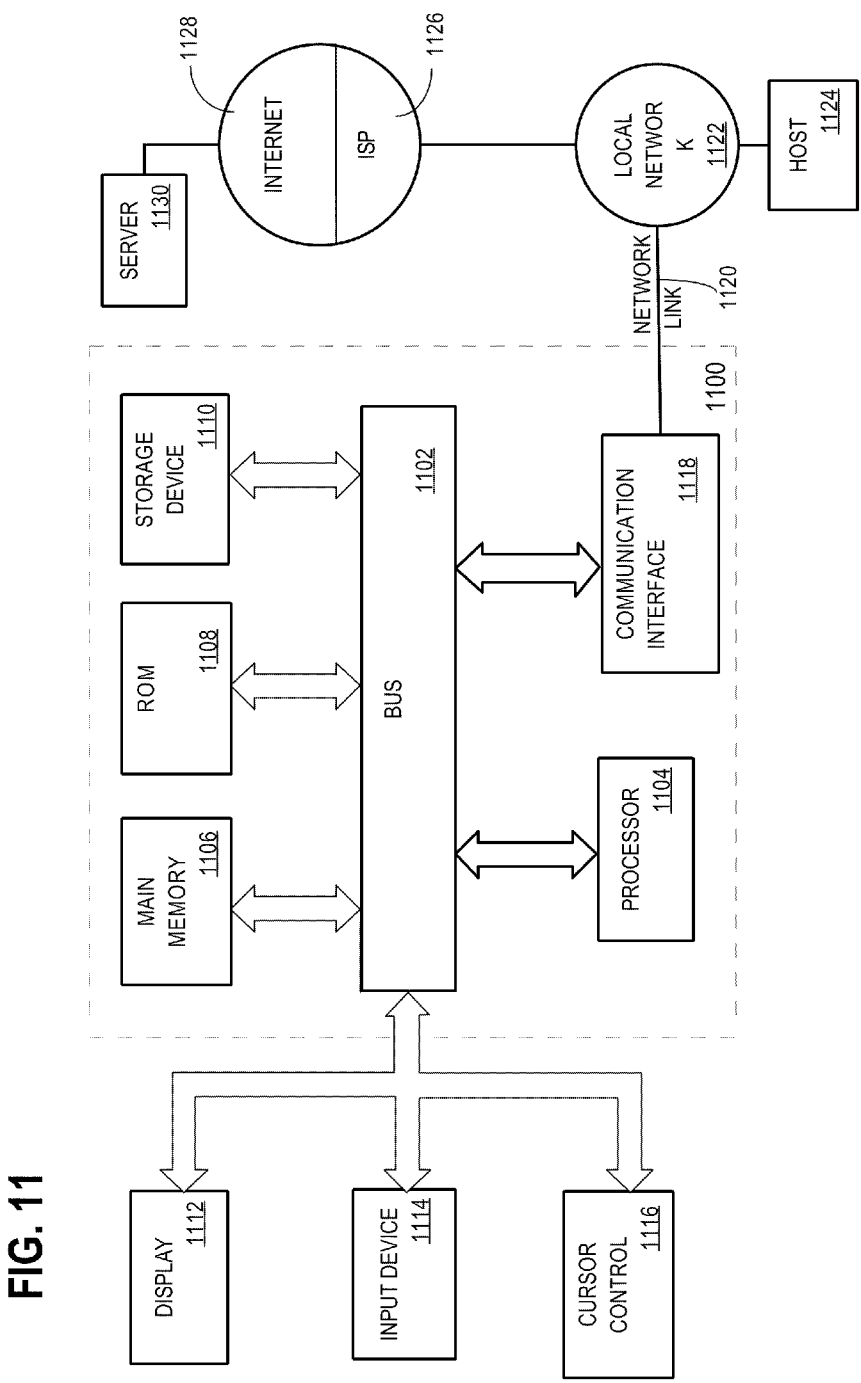
FIG. 11 shows a block diagram of a computer system.

For example, FIG. 11 is a block diagram that illustrates a computer system 1100. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Extensions and Alternatives

In the foregoing specification, for the purposes of explanation, numerous specific details are set forth in order to provide a thorough understanding of the subject matter being discussed. It will be apparent, however, that aspects of the present disclosure may be practiced without these specific details. In other instances, well-known structures and devices are shown in block diagram form in order to avoid unnecessarily obscuring the disclosure. Furthermore, the approaches described in background section are approaches that could be pursued, but not necessarily approaches that have been previously conceived or pursued. Therefore, unless otherwise indicated, it should not be assumed that any of the approaches described in the background section qualify as prior art merely by virtue of their inclusion in that section.

In the foregoing specification, embodiments have been described with reference to numerous specific details that may vary from implementation to implementation. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   determining, based at least in part on a circuit model of a circuit design of a circuit, a first set of state points;
   identifying, within said first set of state points, a second set of state points, wherein the second set of state points is a subset of the first set of state points;
   wherein the second set of state points includes at least one less state point than the first set of state points;
   storing in a matrix probabilities associated with transitioning from a state in the second set of state points to another state in the second set of state points;
   based at least in part on the probabilities stored in the matrix, simulating a behavior of the circuit in response to an input signal;
   wherein the method is performed by one or more computing devices.

2. The method of claim 1, wherein the first set of state points is determined by discretizing one or more continuous probability distribution functions associated with the circuit model.

3. The method of claim 2, wherein the discretizing comprises representing the one or more probability distribution functions as a set of Gaussian basis functions.

4. The method of claim 1, wherein the second set of state points comprise recurrent states.

5. The method of claim 1, wherein the circuit design is a mixed-signal system design.

6. The method of claim 1, wherein the first set of state points comprises recurrent state points and transient state points and the second set of state points excludes transient state points.

7. The method of claim 1, wherein the input signal is periodic.

8. A method comprising:
   determining, based at least in part on a circuit model of a circuit design of a circuit, a first set of state points;
   identifying, within said first set of state points, a second set of state points, wherein the second set of state points is a subset of the first set of state points;
   storing in a matrix probabilities associated with transitioning from a state in the second set of state points to another state in the second set of state points;
   based at least in part on the probabilities stored in the matrix, simulating a behavior of the circuit in response to an input signal;
   wherein identifying the second set of state points includes:
   (a) initializing a set of evaluated states and a set of unevaluated states;
   (b) identifying a seed state;
   (c) identifying a first state, wherein the first state is from the set of unevaluated states or is the seed state;
   (d) simulating a system response starting at the first state;
   (e) based at least in part on the system response, identifying a reachable state and a set of one or more transition probabilities from the first state to the reachable state;
   (f) moving the first state from the set of unevaluated states to the set of evaluated states;
   (g) moving the reachable state to the set of unevaluated states if the reachable state is not already in the set of unevaluated states;
   (h) repeating (c)-(g) until no unevaluated states remain
   wherein the method is performed by one or more computing devices.

9. A method comprising:
   determining, based at least in part on a circuit model of a circuit design of a circuit, a first set of state points;
   identifying, within said first set of state points, a second set of state points, wherein the second set of state points is a subset of the first set of state points;
   storing in a matrix probabilities associated with transitioning from a state in the second set of state points to another state in the second set of state points;
   based at least in part on the probabilities stored in the matrix, simulating a behavior of the circuit in response to an input signal;
   wherein identifying the second set includes:
   (a) initializing a set of evaluated states and a set of unevaluated states;
   (b) identifying a seed state;
   (c) identifying a first state, wherein the first state is from the set of unevaluated states or is the seed state;
   (d) simulating a system response starting at the first state;
   (e) based at least in part on the system response, identifying a reachable state and a set of one or more transition probabilities from the first state to the reachable state;
   (f) moving the first state from the set of unevaluated states to the set of evaluated states;
   (g) moving the reachable state to the set of unevaluated states if the reachable state is not already in the set of unevaluated states;
   (h) determining an aggregate probability that a transition from any state in the set of evaluated states to any state in the set of unevaluated states will occur;
   (i) in response to determining that the aggregate probability is greater than a threshold value, selecting a particular unevaluated state that has a high probability, among the unevaluated states as the first state;
   (j) repeating (c)-(i), until the aggregate probability falls below the threshold value
   wherein the method is performed by one or more computing devices.

10. One or more non-transitory computer readable storage mediums storing instructions which, when executed by one or more computing devices, cause performance of:
    determining, based at least in part on a circuit model of a circuit design of a circuit, a first set of state points;
    identifying, within said first set of state points, a second set of state points, wherein the second set of state points is a subset of the first set of state points;
    wherein the second set of state points includes at least one less state point than the first set of state points;
    storing in a matrix probabilities associated with transitioning from a state in the second set of state points to another state in the second set of state points;
    based at least in part on the probabilities stored in the matrix, simulating a behavior of the circuit in response to an input signal.

11. The non-transitory computer readable storage mediums of claim 10 wherein the first set of state points is determined by discretizing one or more continuous probability distribution functions associated with the circuit model.

12. The non-transitory computer readable storage mediums of claim 11 wherein the discretizing comprises representing the one or more probability distribution functions as a set of Gaussian basis functions.

13. The non-transitory computer readable storage mediums of claim 10 wherein the second set of state points comprise recurrent states.

14. The non-transitory computer readable storage mediums of claim 10 wherein the circuit design is a mixed-signal system design.

15. The non-transitory computer readable storage mediums of claim 10 wherein the first set of state points comprises recurrent state points and transient state points and the second set of state points excludes transient state points.

16. The non-transitory computer readable storage mediums of claim 10 wherein the input signal is periodic.

17. One or more non-transitory computer readable storage mediums storing instructions which, when executed by one or more computing devices, cause performance of:
    determining, based at least in part on a circuit model of a circuit design of a circuit, a first set of state points;
    identifying, within said first set of state points, a second set of state points, wherein the second set of state points is a subset of the first set of state points;
    storing in a matrix probabilities associated with transitioning from a state in the second set of state points to another state in the second set of state points;
    based at least in part on the probabilities stored in the matrix, simulating a behavior of the circuit in response to an input signal;
    wherein identifying the second set of state points includes:
        (a) initializing a set of evaluated states and a set of unevaluated states;
        (b) identifying a seed state;
        (c) identifying a first state, wherein the first state is from the set of unevaluated states or is the seed state;
        (d) simulating a system response starting at the first state;
        (e) based at least in part on the system response, identifying a reachable state and a set of one or more transition probabilities from the first state to the reachable state;
        (f) moving the first state from the set of unevaluated states to the set of evaluated states;
        (g) moving the reachable state to the set of unevaluated states if the reachable state is not already in the set of unevaluated states;
        (h) repeating (c)-(g) until no unevaluated states remain.

18. One or more non-transitory computer readable storage mediums storing instructions which, when executed by one or more computing devices, cause performance of:
    determining, based at least in part on a circuit model of a circuit design of a circuit, a first set of state points;
    identifying, within said first set of state points, a second set of state points, wherein the second set of state points is a subset of the first set of state points;
    storing in a matrix probabilities associated with transitioning from a state in the second set of state points to another state in the second set of state points;
    based at least in part on the probabilities stored in the matrix, simulating a behavior of the circuit in response to an input signal;
    wherein identifying the second set includes:
        (a) initializing a set of evaluated states and a set of unevaluated states;
        (b) identifying a seed state;
        (c) identifying a first state, wherein the first state is from the set of unevaluated states or is the seed state;
        (d) simulating a system response starting at the first state;
        (e) based at least in part on the system response, identifying a reachable state and a set of one or more transition probabilities from the first state to the reachable state;
        (f) moving the first state from the set of unevaluated states to the set of evaluated states;
        (g) moving the reachable state to the set of unevaluated states if the reachable state is not already in the set of unevaluated states;
        (h) determining an aggregate probability that a transition from any state in the set of evaluated states to any state in the set of unevaluated states will occur;
        (i) in response to determining that the aggregate probability is greater than a threshold value, selecting a particular unevaluated state that has a high probability, among the unevaluated states as the first state;
        (j) repeating (c)-(i), until the aggregate probability falls below the threshold value.

\* \* \* \* \*